United States Patent [19]

Phadke

[11] 4,148,087

[45] Apr. 3, 1979

[54] DISTANCE RELAY FOR ELECTRIC POWER TRANSMISSION LINES

[76] Inventor: Arun G. Phadke, 15 Eros Ct., Wayne, N.J. 07470

[21] Appl. No.: 789,342

[22] Filed: Apr. 20, 1977

[51] Int. Cl.$^2$ .......................................... H02H 3/26
[52] U.S. Cl. ...................................... 361/80; 324/52; 361/81
[58] Field of Search ...................... 361/80, 81; 324/52

[56] References Cited

U.S. PATENT DOCUMENTS

| | | | |
|---|---|---|---|
| 2,879,454 | 3/1959 | Hodges et al. | 361/68 |
| 3,337,774 | 8/1967 | Rockefeller | 361/81 |
| 3,339,115 | 8/1967 | Calhoun | 361/82 |
| 3,379,936 | 4/1968 | Hoel | 361/81 |
| 3,413,523 | 11/1968 | Hoel | 361/80 |
| 3,430,103 | 2/1969 | Rockefeller | 361/63 |
| 3,526,761 | 9/1970 | Smith | 235/181 |
| 3,538,384 | 11/1970 | Crockett | 361/85 |
| 3,569,785 | 3/1971 | Durbeck et al. | 361/80 |
| 3,599,044 | 8/1971 | Takemura et al. | 361/82 |
| 3,612,989 | 10/1971 | Souillard et al. | 324/52 |
| 3,651,377 | 3/1972 | Souillard | 361/82 |
| 3,723,864 | 3/1973 | Ricard | 324/52 |
| 3,731,152 | 5/1973 | Rockefeller | 361/80 |
| 3,732,464 | 5/1973 | Miki et al. | 361/80 |
| 3,735,204 | 5/1973 | Maenicke | 361/80 |
| 3,800,215 | 3/1974 | Souillard | 324/52 |

OTHER PUBLICATIONS

"Fundamental Basis for Distance Relaying on 3-Phase Systems", Lewis et al., AIEE Transactions, vol. 66, 1947.

Primary Examiner—Harry E. Moose, Jr.
Attorney, Agent, or Firm—Pennie & Edmonds

[57] ABSTRACT

A distance relay system for a three-phase electric power transmission line comprises means for producing positive, negative and zero sequence symmetrical component voltages from the phase voltages of the line, and means for producing positive, negative and zero sequence voltage drops from the corresponding sequence currents and impedances of the line. Zero sequence current in a parallel line and the mutual impedance between the lines may be taken into account. Predetermined ratios of the sequence voltages and changes in the voltage drops are used to produce a distance factor K corresponding to the ratio of the distance to a fault on the line and the length of the line. The single equation for K applies to all ten fault conditions that can occur on the line. A fault signal is produced when K lies between predetermined fault values. The faulted phase of single phase to ground faults may be identified. Particular expressions for K are given.

12 Claims, 20 Drawing Figures

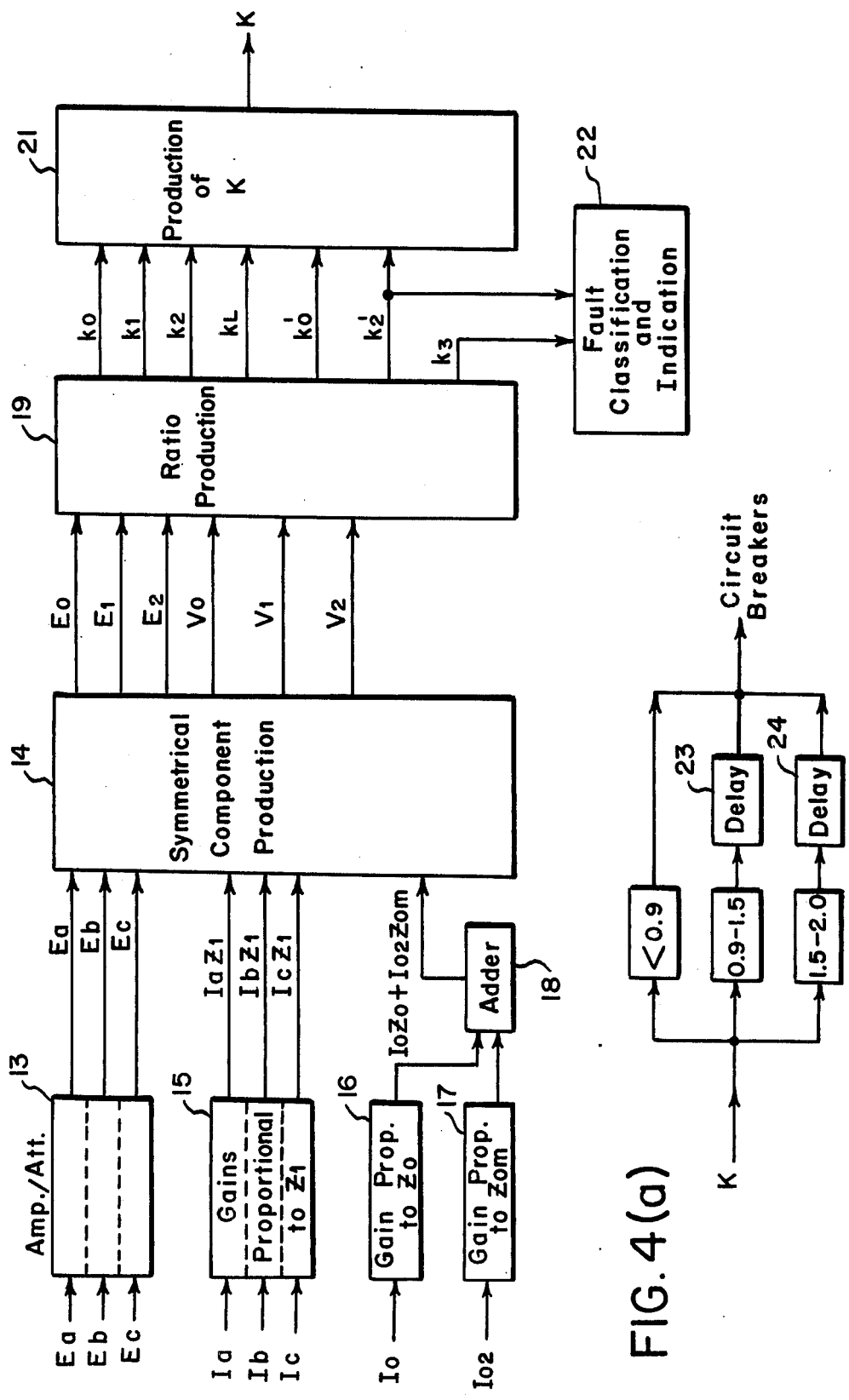

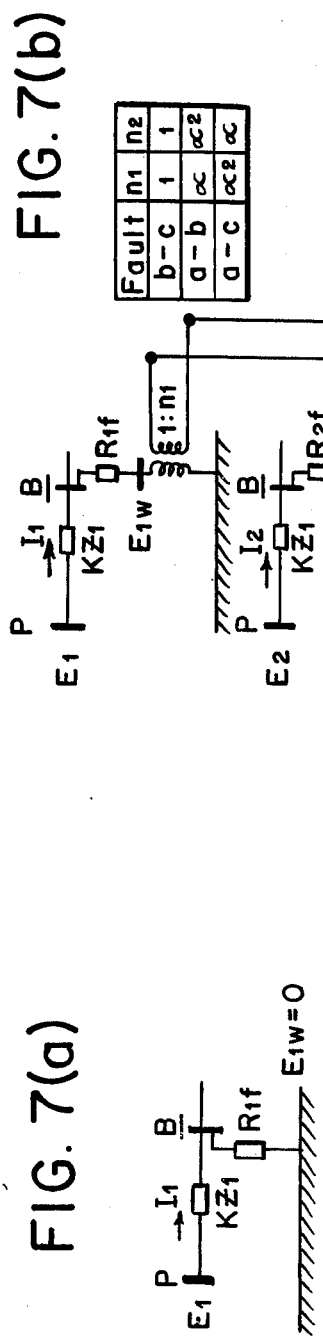
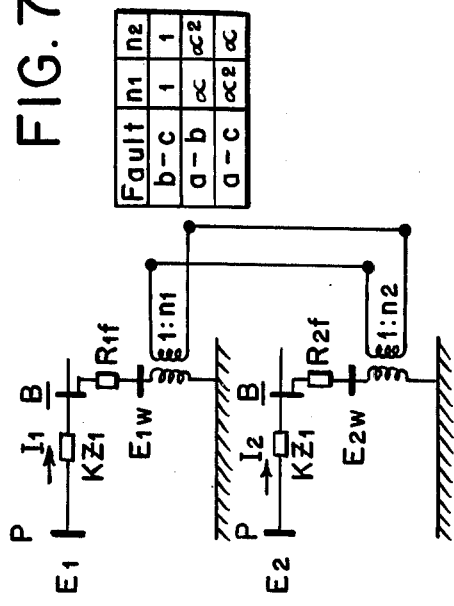
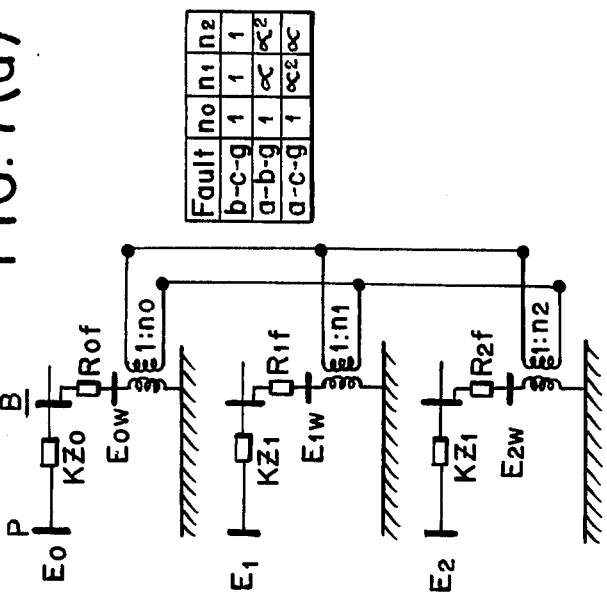
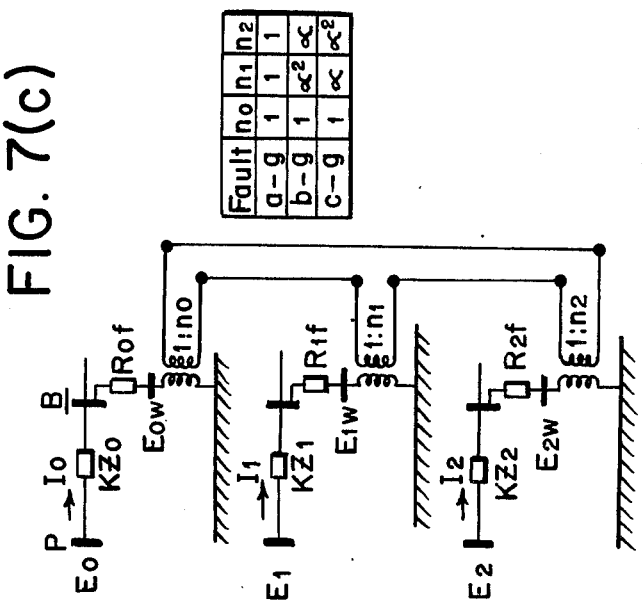
FIG. 7(a)
FIG. 7(b)
| Fault | n1 | n2 |
|---|---|---|
| b-c | 1 | 1 |
| a-b | $\alpha^2$ | $\alpha$ |
| a-c | $\alpha$ | $\alpha^2$ |
FIG. 7(c)
| Fault | no | n1 | n2 |
|---|---|---|---|
| a-g | 1 | 1 | 1 |
| b-g | 1 | $\alpha^2$ | $\alpha$ |
| c-g | 1 | $\alpha$ | $\alpha^2$ |
FIG. 7(d)
| Fault | no | n1 | n2 |
|---|---|---|---|
| b-c-g | 1 | 1 | 1 |
| a-b-g | 1 | $\alpha$ | $\alpha^2$ |
| a-c-g | 1 | $\alpha^2$ | $\alpha$ |

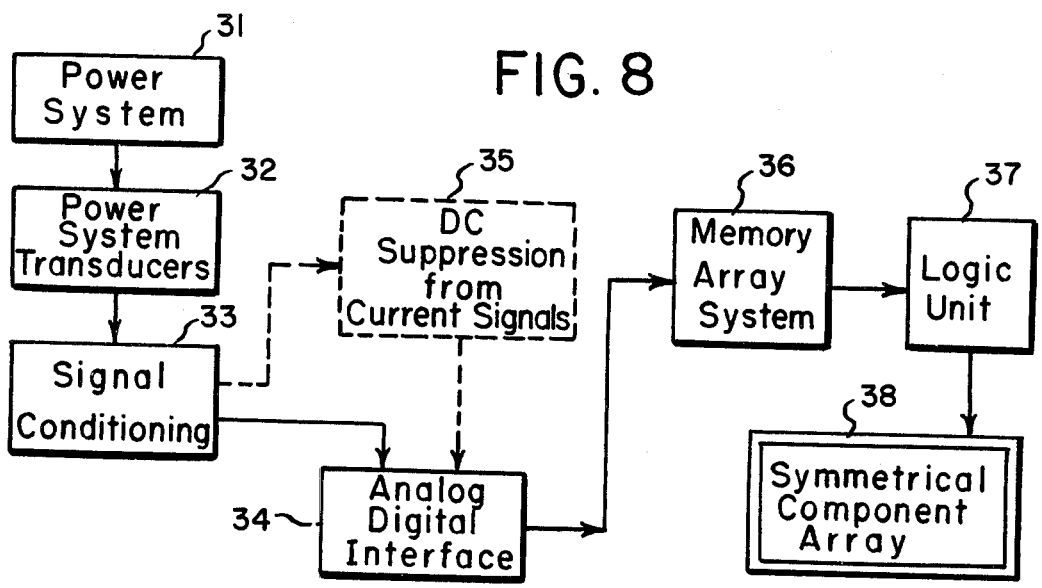
FIG. 8
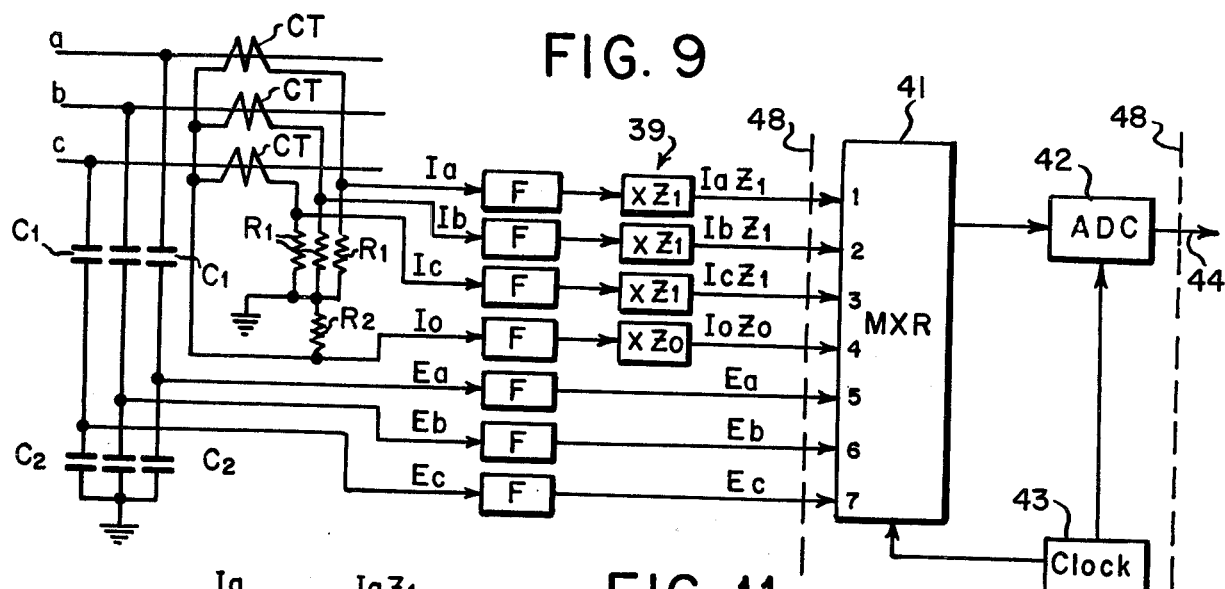
FIG. 9
FIG. 10
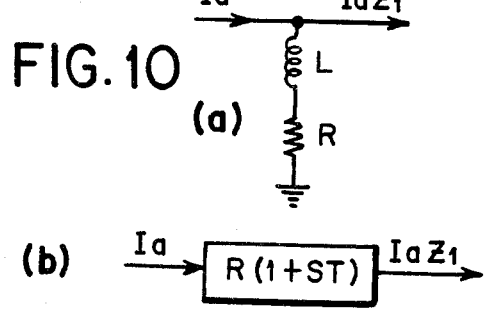
FIG. 12
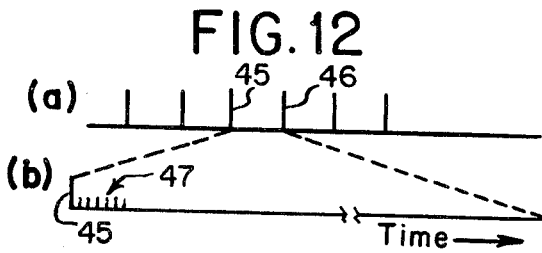
FIG. 11
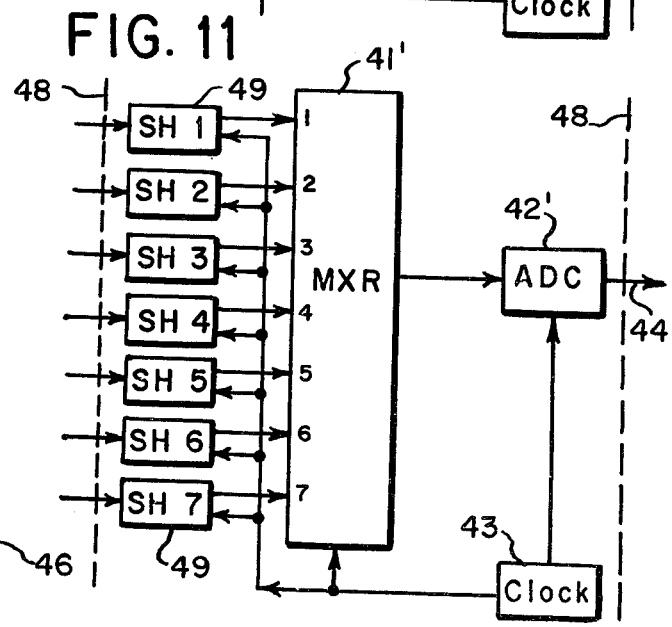

DISTANCE RELAY FOR ELECTRIC POWER TRANSMISSION LINES

The present invention relates to a distance relay for electric power transmission lines.

Electric power is commonly transmitted over long distances by high-voltage three-phase transmission lines. Faults occurring on such lines as by lightning falling trees or limbs, etc. may have serious consequences unless the line is promptly taken out of service when a fault occurs. Inasmuch as the transmission line and associated generating equipment are expensive, elaborate protection devices are commonly employed. Short circuit faults are particularly serious, since they can quickly result in extensive damage.

Distance relays are frequently provided to sense the occurrence of a fault and operate circuit breakers as required. Inasmuch as ten different short circuit conditions can occur, several relays are required in order to respond to any condition which actually occurs. Such relays are quite expensive. For example, distance relays are available which compute the line impedance from line voltages and currents. Normally six impedance units are employed to cover all ten fault conditions. It is possible to employ a single impedance unit and a switching logic unit which selects the appropriate voltage-current pair for the impedance unit. Such an operation takes time to test all the voltage-current pairs, and involves undesirable switching complexities.

The present invention provides a distance relay which will respond to any of the ten short circuit conditions that can occur, and is capable of very fast operation, say within approximately one cycle of the power line frequency and even less under some circumstances. The ten fault conditions are: a three-phase fault, three phase-to-phase faults, three single-phase to ground faults, and three double-phase to ground faults.

The distance from the relay location to the fault may be determined, and used to control circuit breakers and perform other protective functions. This also aids repair crews to locate the fault region promptly. Further, in the case of single-phase to ground faults, the faulted phase may be identified.

In accordance with the invention, positive, negative and zero sequence symmetrical components of the transmission line voltages are produced, and also symmetrical components of voltage drops due to current flow in the transmission line. Predetermined ratios of the symmetrical component voltages and changes in the voltage drops are produced and used to determine a distance factor K corresponding to the ratio of the distance to a fault and the length of the transmission line. A fault signal is produced when the distance factor lies between predetermined fault values.

Under normal balanced load conditions the factor K will be large, much greater than unity. When a fault occurs on the line being protected, the value of K will drop to less than unity, and may be used to actuate circuit breakers promptly to isolate the line. A fault occurring somewhat beyond the line being protected will give an intermediate value of K, and such a value may be used to isolate the line after a predetermined time delay if the fault persists.

Zero and negative sequence currents are zero or small under normal operating conditions where the transmission line is balanced, and the corresponding sequence voltage drops are zero or small. Thus for these sequences the currents and voltage drops under fault conditions are the changes in current and voltage drops. The positive sequence current under normal operating conditions depends on the load on the line, and the difference between normal and fault voltage drops is employed. In many cases, however, normal load current may be unimportant as compared to fault current, such as where the generating capacity connected to the line is capable of supplying a fault current much larger than the normal maximum load current, say ten times. In such cases the normal line current and voltage drop may be neglected and the positive sequence voltage drop may be used as the change in positive sequence voltage drop.

Symmetrical components have long been used to analyze the performance of three-phase power lines under fault conditions. In general such analysis involves the choice of a reference phase for the positive and negative sequence components. Inasmuch as different phases may be involved in a fault condition, the equations for the fault conditions depend in part on the choice of the reference phase. In accordance with the present invention certain ratios are employed which are independent of the reference phase. This enables the development of a single performance equation which adequately applies to all types of balanced and unbalanced faults.

To produce the symmetrical components, the various ratios and the distance factor K, computation is involved. Such computation may be performed using analog or digital techniques. However, at the present time digital type computers are available which are versatile, fast and accurate, and are less expensive than analog computers. Hence digital computations are preferred, and are used in the specific embodiments described. Either dedicated or time-sharing computer facilities may be employed, although dedicated facilities are preferred so as to assure quick response when a fault occurs.

BRIEF DESCRIPTION OF THE DRAWINGS

FIGS. 4 and 4(a) are block diagrams illustrating a distance relay in accordance with the invention;

FIGS. 7(a)–7(d) show symmetrical component representations of various types of faults;

FIG. 8 is a block diagram of apparatus for producing symmetrical components of power line voltages and currents;

FIGS. 9–14 illustrate means for instrumenting various portions of FIG. 8; and

DESCRIPTION OF THE SPECIFIC EMBODIMENTS

Figure 1:
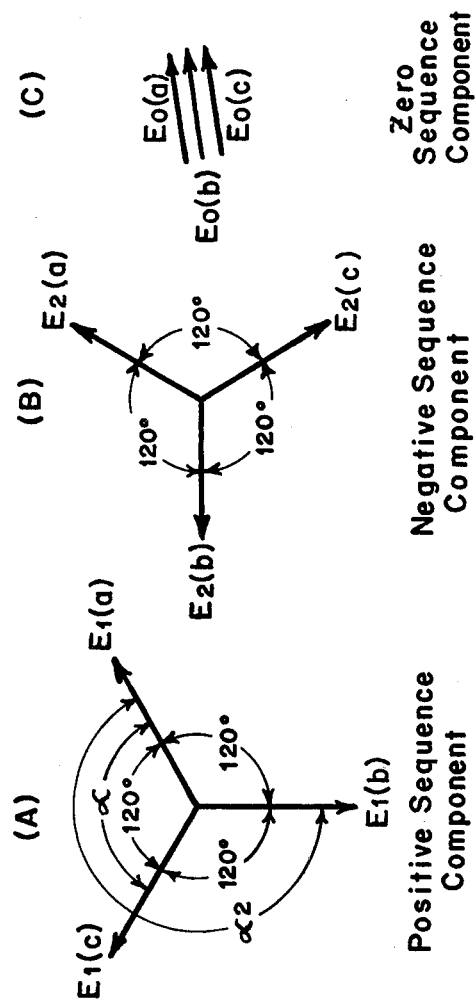
FIG. 1 is a simplified one-line diagram of two parallel three-phase transmission lines forming part of a power system.

Referring to FIG. 1, a power transmission system is shown using a conventional single line diagram. Two parallel three-phase lines 1 and 2 are connected between buses P and Q and three-phase equivalent power sources $E_G$ and $E_H$ are connected to respective buses. Line 1 has zero and positive sequence impedances $Z_0$ and $Z_1$, denoting the impedances to zero sequence and positive sequence current flow in symmetrical component analysis. Line 2 has a similar impedances but they are not shown since the distance relay will be assumed to be associated with line 1. However, zero sequence current flowing in line 1 under fault conditions may induce a zero sequence current in line 2 through the mutual impedance between the lines, denoted $Z_{om}$, and affect the zero sequence voltage drop in line 1.

At very high voltages commonly there will not be a parallel transmission line. Such a parallel line is shwon, however, since if one is present and significantly affects line 1, the effect may be taken into account.

A fault will be assumed to occur at B in line 1, located at a fractional distance K from bus P, where K is the ratio of the distance from P to B to the distance from P to Q. Various types of faults will be discussed hereinafter. In general there may be some resistance in a fault, and this will be referenced to a bus W discussed later.

Figure 2:
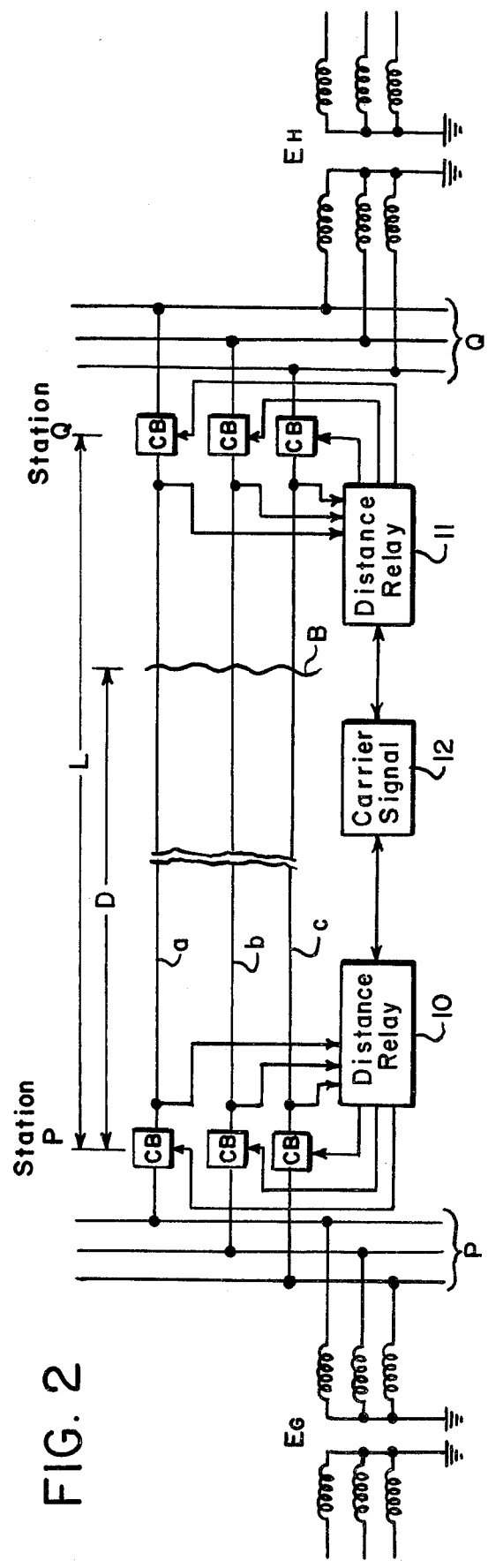
FIG. 2 is a more detailed schematic of a three-phase transmission line with distance relays associated therewith.

FIG. 2 shows line 1 of FIG. 1 in greater detail. Here a threee-phase line having phases a, b, and c extends from Station P to Station Q. Three-phase buses P and Q are located at respective stations. Power sources $E_G$ and $E_H$ are shown as three-phase transformers connecting the line shown with other lines or with generators, depending on the system configuration. In actual practice, the transformers may be absent and buses P and Q may be connected to other transmission lines of the system. Circuit breakers CB are inserted in each phase of the line and at each end so that the phases can be isolated in the event of a fault.

A distance relay 10 is located at Station P and responds to faults on the line to actuate the circuit breakers as required. Advantageously a second distance relay 11 is located at Station Q, and also responds to faults on the line to actuate circuit breakers as required. The distance relays are interconnected by a carrier signal circuit 12 which provides intercommunication, and which may utilize telephone lines, microwave relay circuits or the power line itself.

The distance from Station P to a fault at B is denoted D, and the distance between stations is denoted L. Hence the fractional distance K from Station P to the fault is equal to D/L. A similar fractional distance K' from Station Q to a fault at B would be (L−D)/L.

Figure 3:
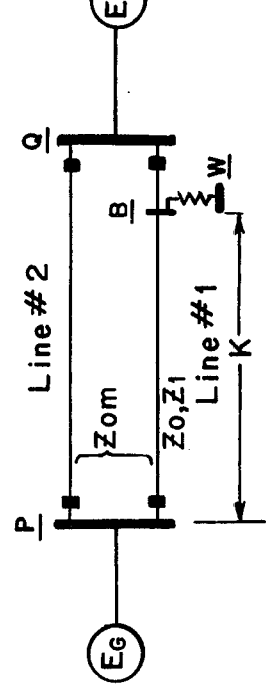
FIG. 3 illustrates positive, negative and zero sequence symmetrical components.

FIG. 3 shows conventional representations of symmetrical components. The positive sequence component is shown at (A) and has three phasors of equal amplitude and equal angular spacing. The phasors rotate in synchronism as is well known in A-C theory. Voltages are denoted E and the subscript 1 denotes positive sequence. The phases are denoted by subscripts (a), (b) and (c). The negative sequence component is shown at (B) and also has three phasors of equal amplitude and angular spacing. The subscript 2 denotes negative sequence. The zero sequence component shown at (C) has three equal phasors all at the same angle. The amplitudes of the positive, negative and zero sequence components will usually not be the same, and their phase angles with respect to each other will usually not be the same. The symmetrical components for current are similar.

FIG. 4 is a block diagram of a distance relay in accordance with the invention. Phase to neutral voltages $E_a$, $E_b$ and $E_c$ of the power line are measured and supplied through respective amplifiers and/or attenuators 13, as desired, to block 14 in which voltage symmetrical components are produced. Phase currents $I_a, I_b$ and $I_c$ of the power line are supplied to amplifiers and/or attenuators 15 having gains proportional to the positive sequence impedance of the transmission line, denoted $Z_1$. In normal transmission lines the positive and negative sequence impedances are the same. Consequently the outputs of 15, e.g. $I_a Z_1$, correspond to voltage drops along the line for which positive and negative sequence voltage drops can be determined. They also are supplied to block 14.

Zero sequence current in transmission line 1, denoted $I_0$, is supplied to an amplifier and/or attenuator 16 having a gain porportional to the zero sequence impedance of line 1 to yield a corresponding voltage drop along the line. If a second transmission line 2 parallels line 1 and significantly affects line 1, the zero sequence current $I_{02}$ in line 2 is supplied to amplifier and/or attenuator 17 having a gain proportional to $Z_{om}$, thereby giving the zero sequence voltage drop in line 1 due to zero sequence current flowing in line 2. The outputs of 16 and 17 are added in 18 and supplied to block 14.

In block 14 symmetrical components $E_0$, $E_1$ and $E_2$ are produced which correspond to the zero, positive and negative sequence components of the line voltages existing at Station P. Block 14 also produces symmetrical components $V_0$, $V_1$ and $V_2$ which correspond to voltage drops along line 1 due to current flow therein (and current flow in a parallel line 2 if significant). These components are supplied to clock 19.

In block 19 various voltage ratios are produced which are denored k with subscripts and primes as indicated. These ratios will be described in detail hereinafter. Briefly, the ratios are independent of the reference phase chosen for analysis, and enable the performance of a faulted line to be expressed by a single equation regardless of the type of fault.

Ratios produced in 19 are supplied to block 21 which produces an output K representing the fractional distance from Station P to a fault, as described above. Selected ratios are supplied to block 22 which determines the existence of certain types of faults and indicates the type. Suitable circuits will be described later.

The protection afforded by distance relays is frequently divided into three zones. Zone 1 is the zone of primary protection and is to protect the line between Stations P and Q of FIG. 2 against faults occurring on the line. Faults occurring beyond Station Q may actuate the distance relay at Station P until the faulted line is isolated by appropriate protection devices at or beyond Station Q. To assure isolation of the faulted portion of a network if subsequent protective devices fail, a Zone 2 is established for distances somewhat beyond Station Q and, if the fault conditions persists, line 1 is isolated after selected time delay. Zone 3 is for still greater distances beyond Station Q, and a greater time delay is used. Different boundary values of K may be selected for different zones of protection.

The fractional distance K is subject to some error, due primarily to measurement errors and to fault resistance. Thus as K approaches unity, corresponding to a fault near Station Q, the actual fault might be just beyond Station Q. A similar uncertainty exists in known types of distance relays. To allow for the uncertainty, a value of K of approximately 0.9 or somewhat less may be selected for primary zone protection, as illustrated in FIG. 4(a). Then if K is about :b 0.9 or less, the circuit breakers CB in FIG. 2 may be opened immediately at both Stations P and Q. Somewhat greater values of K, say 0.9–1.5, may be selected for Zone 2 and, after a delay indicated at 23, the circuit breakers actuated. Similarly, still greater values of K, say 1.5–2.0, and a greater delay indicated at 24, may be used for Zone 3 protection. In order to account for the uncertainties of the K computation and the effect of infeed at intermediate buses beyond bus Q, the zone boundaries may be areas in the complex plane for K. If desired, for Zone 2 and Zone 3 protection, only the circuit breakers at Station P may be opened.

As will be understood, if a K of 0.95 actually corresponds to a fault on line 1 just short of Station Q, the line will be isolated only after delay 23. To assure prompt isolation in such a case, a distance relay at Station Q may be employed as shown at 11 in FIG. 2. Faults on line 1 adjacent Station Q will then yield small values of K at relay 11 and promptly actuate the associated circuit breakers. Further, the intelligence gathered by the delay at Q may be transmitted to the relay at P via the carrier signal to open the circuit breakers at P. The sign of K, that is, positive or negative, may be used to establish the direction in which faults are sensed.

Figure 5:
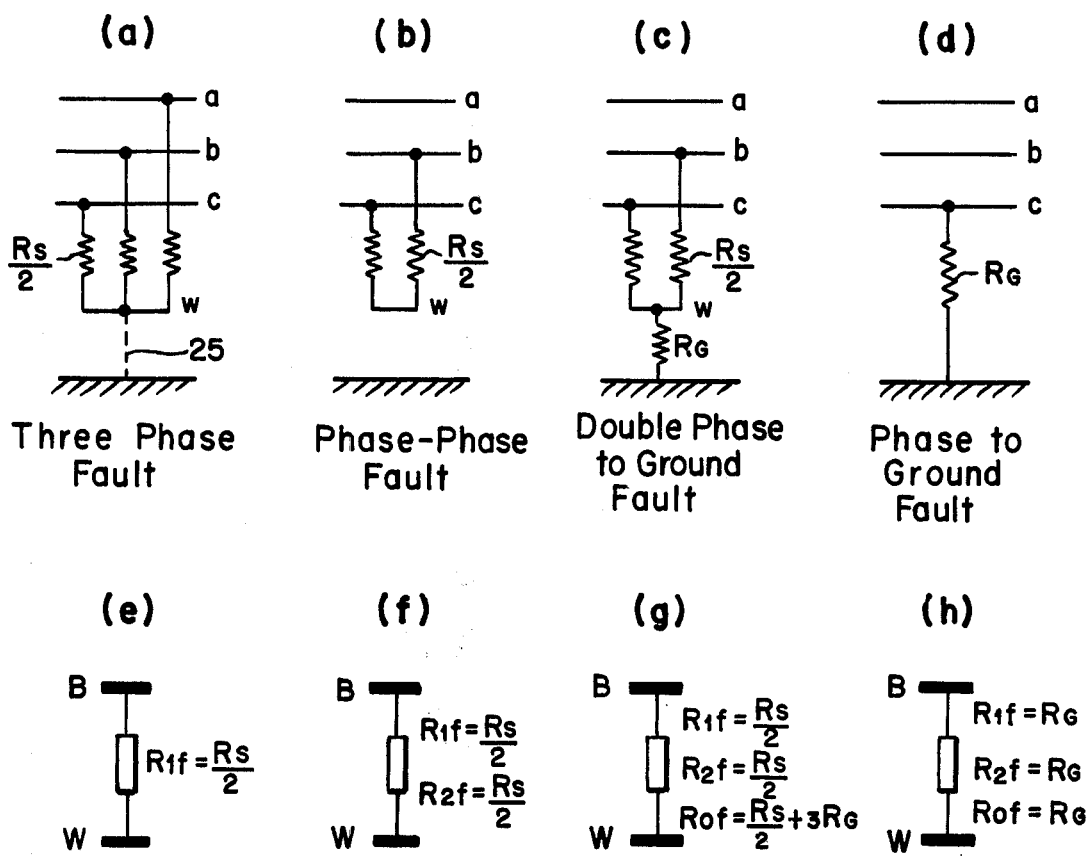
FIGS. 5(a)–5(h) illustrate various types of fault conditions on a three-phase line, and their corresponding symmetrical component representations.

Referring to FIG. 5, several types of faults which can occur on a three-phase line are shown. They will be assumed to occur at B in FIG. 2, and individual phase lines are denoted a, b and c.

FIG. 5(a) illustrates a three-phase fault. Although all three lines could come into physical contact, more likely arcing will occur between the phase lines. Such arcs may have some resistance. For convenience, the electrical center of the arc is denoted as bus W, and the resistance from each line to bus W is denoted $R_s/2$. The arcs may or may not be to ground, as illustrated by the dash line 25.

FIG. 5(b) illustrates a phase-to-phase fault, as when arcing occurs between only two of the phase lines. The resistance $R_s/2$ is assumed to exist between each of the faulted phases and bus W. As shown, the fault is between phases b and c. The fault could occur between a and b or between a and c. Thus three different phase-to-phase faults can occur.

FIG. 5(c) illustrates a double-phase to ground fault. Here bus W is assumed to have a resistance $R_G$ to ground. Inasmuch as any two phases can be faulted to ground, three different double-phase to ground faults can occur.

FIG. 5(d) illustrates a single-phase to ground fault, with a resistance to ground of $R_G$. Any phase could be faulted, giving three possible phase to ground faults.

As is apparent, ten different faults can occur, and all must be taken into account in developing a distance relay.

FIGS. 5(e)–5(h) show the symmetrical component representations of the resistances in FIGS. 5(a)–5(d), respectively. $R_{1f}$ is the positive sequence component of the fault resistance, $R_{2f}$ is the negative sequence component, and $R_{0f}$ is the zero sequence component. The actual values of the resistances will be determined by the fault conditions, and are of course unknown.

As will be apparent hereinafter, the performance equation for the distance relay is obtained under the assumption of zero fault path resistances. However, expressions for the resulting errors will be given and will be shown to be proportional to the magnitude of the fault path resistance. Since the arc is likely to be short during the first cycle of the short circuit, the errors due to fault path resistance may be expected to be small for a high-speed relay.

The symmetrical components of voltages and currents at Station P in FIG. 2, forming the inputs to distance relay 10, will be considered in the following analysis. Pre-fault values of the voltages and currents are designated with a bar on top of the varibles. Thus, for balanced pre-fault conditions, the positive sequence components $\bar{E}_1$ and $\bar{I}_1$ are the principal variables. Although this distinction between pre-fault and post fault quantities is possible in an analytical context, it should be realized that during system operation the variables with a bar on top are to be interpreted as old values of the corresponding variables without the bar. The process is recursive, the variables without bars being transformed into variables with bars in step with the passage of time.

In accordance with conventional symmetrical component analysis, the following equations apply to three-phase voltages.

$$E_0 = \tfrac{1}{3}(E_a + E_b + E_c)$$

$$E_1 = \tfrac{1}{3}(E_a + \alpha E_b + \alpha^2 E_c) \qquad (1)$$

$$E_2 = \tfrac{1}{3}(E_a + \alpha^2 E_b + \alpha E_c)$$

The multipliers $\alpha$ and $\alpha^2$ are $\exp(j\,2\pi/3)$ and $\exp(-j\,2\pi/3)$, respectively. Similar equations apply to currents.

Figure 6:
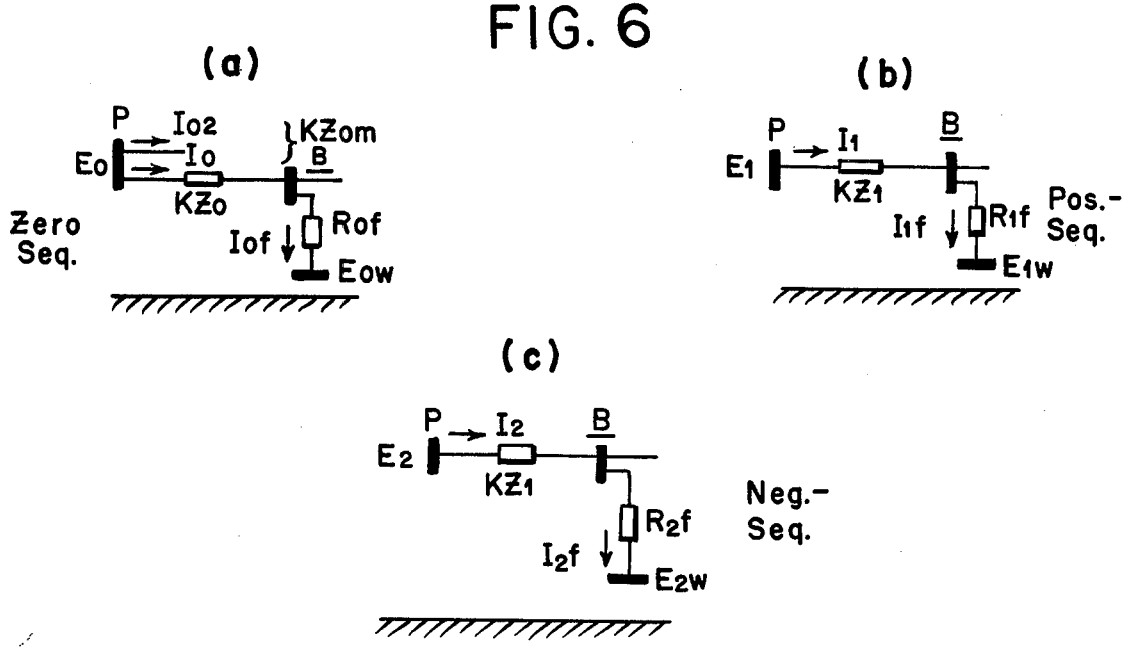
FIGS. 6(a)–6(c) illustrate symmetrical component voltages and currents occurring during a fault.

Upon occurrence of a fault at B in FIG. 2, the resulting symmetrical component voltages and currents are as shown in FIG. 6. Zero sequence components are shown in (a), positive sequence components in (b) and negative sequence components in (c). With a fault at B, only the fraction K of the total line impedance is effective. The figures are intended to apply generally to the fault conditions illustrated in FIG. 5, and in the cases where zero or negative sequence resistance components do not exist, the corresponding diagrams of FIG. 6 do not apply.

Under fault conditions the following symmetrical component voltage equations apply.

$$E_{0w} = E_0 - KI_0 Z_0 - KI_{02} Z_{0m} - R_{0f} I_{0f}$$

$$E_{1w} = E_1 - KI_1 Z_1 - R_{1f} I_{1f} \qquad (2)$$

$$E_{2w} = E_2 - KI_2 Z_1 - R_{2f} I_{2f}$$

The currents $I_{0f}$, $I_{1f}$ and $I_{2f}$ are the symmetrical components of the fault currents.

The symmetrical component line currents change as follows:

$$\Delta I_0 = I_0 - \bar{I}_0 \approx I_0 \quad 0$$

$$\Delta I_1 = I_1 - \bar{I}_1 \qquad (3)$$

$$\Delta I_2 = I_2 - \bar{I}_2 \approx I_2$$

It will be noted that the changes in zero and negative sequence currents are given as substantially equal to the corresponding currents flowing after a fault occurs.

This is justified by the fact that prior to a fault the line will be balanced so that zero and negative sequence currents can be considered negligible.

Using equations (3) in equation (2) gives:

$$E_{0w} = E_0 - K\Delta I_0 Z_0 - K\Delta I_{02} Z_{0m} - R_0 I_{0f}$$

$$E_{1w} = E_1 - K\Delta I_1 Z_1 - K\overline{I}_1 Z_1 - R_1 I_{1f} \quad (4)$$

$$E_{2w} = E_2 - K\Delta I_2 Z_1 - R_2 I_{2f}$$

Inasmuch as the product of current and impedance is a voltage drop (designated V with a subscript), the following relationships exist:

$$V_0 = I_0 Z_0 + I_{02} Z_{0m}$$

$$V_1 = I_1 Z_1 \quad (5)$$

$$V_2 = I_2 Z_1$$

Under fault conditions, by analogy to equations (3), the line voltage drops can be stated as:

$$\Delta V_0 = V_0 \simeq \overline{V}_0$$

$$\Delta V_1 = V_1 - \overline{V}_1 \quad (6)$$

$$\Delta V_2 = V_2 - \overline{V}_2 \simeq V_2$$

The following ratios will now be defined:

$$k_0 = \frac{E_0}{\Delta V_0} \quad (7)$$

$$k_1 = \frac{E_1}{\Delta V_1}$$

$$k_2 = \frac{E_2}{\Delta V_2}$$

$$k_L = \frac{\overline{V}_1}{\Delta V_1}$$

Using equations (6) and (7) in equations (4), the following equations can be obtained:

$$E_{0w} = \Delta V_0(k_0 - K) - R_0 I_{0f}$$
$$E_{1w} = \Delta V_1(k_1 - K\{1 + k_L\}) - R_1 I_{1f} \quad (8)$$
$$E_{2w} \Delta V_2(k_2 - K) - R_2 I_{2f}$$

It should be noted that the first three ratios in equations (7) are between voltages and voltage drops of the same sequence, and that the last ratio $k_L$ is between voltage drops (and hence currents) of the same sequence. Consequently the k's are invariant under a change of reference phase for the symmetrical components. That is, any phase a, b or c may be selected as the reference phase without altering the k ratios.

This is a very important property, since any expression which is solely dependent on the k's will be independent of the reference phase and will be independent of the phase involved in a balanced or unbalanced fault.

Three-Phase Fault

The symmetrical component representation for this fault is shown in FIG. 7(a). Only positive sequence components are involved, and bus W may be considered to be at ground potential. Substituting these boundary conditions in the second of equations (8) and rearranging, yields:

$$K = \frac{k_1}{1 + k_L} + \epsilon_r \quad (9)$$

where $$\epsilon_r = \frac{-R_1 I_{1f}}{\Delta V_1 (1 + k_L)} \quad (10)$$

The quantity $\epsilon_r$ is an error term proportional to fault resistance. This and similar error terms developed below will be discussed later.

Phase-to-Phase Faults

Three such faults can occur, as previously explained. FIG. 7(b) is a symmetrical component representation of the faults, using the values given in the box for faults between different pairs of lines. Imposing these boundary conditions, the following equations result:

For the b-c fault:

$$E_{1w} = E_{2w} \quad (11\text{-}a)$$

$$\Delta V_1 = -\Delta V_2$$

For the a-b fault:

$$aE_{1w} = a^2 E_{2w} \quad (11\text{-}b)$$

$$a\Delta V_1 = -a^2 \Delta V_2$$

For the a-c fault:

$$a^2 E_{1w} = aE_{2w} \quad (11\text{-}c)$$

$$a^2 \Delta V_1 = -aE\Delta V_2$$

Substituting these equations in equations (8) and rearranging yields:

$$K = \frac{k_1 + k_2}{2 + k_L} + \epsilon_r \quad (12)$$

The term $\epsilon_r$ for the a-b fault is:

$$\epsilon_r = \frac{R_1 I_{1f} - a R_2 I_{2f}}{\Delta V_1 (2 + k_L)} \quad (13)$$

The $\epsilon_r$ term for the b-c fault is the same except that $a$ is omitted, and for the a-c fault that $a$ becomes $a^2$.

Phase to Ground Fault:
The symmetrical component representation is shown in FIG. 7(c). Boundary conditions are:
For phase a to ground:

$$E_{1w} + E_{2w} + E_{0w} = 0 \quad (14\text{-}a)$$

$$\Delta V_1 = \Delta V_2$$

For phase c to ground:

$$aE_{1w} + a^2 E_{2w} + E_{0w} = 0 \quad (14\text{-}b)$$
$$a\Delta V_1 = a^2 \Delta V_2$$

For phase b to ground:

$$a^2 E_{1w} + aE_{2w} + E_{0w} = 0 \quad (14\text{-}c)$$
$$a^2 \Delta V_1 = a\Delta V_2$$

Substituting these equations in equations (8) leads to expressions for K:

For the phase a to ground fault:

$$K = \frac{k_1 + k_2 + k_0 \cdot \frac{\Delta V_0}{\Delta V_1}}{2 + k_L + \frac{\Delta V_0}{\Delta V_1}} + \epsilon_r \qquad (15\text{-a})$$

For the phase c to ground fault:

$$K = \frac{k_1 + k_2 + k_0 \cdot \frac{\Delta V_0}{\alpha \Delta V_1}}{2 + k_L + \frac{\Delta V_0}{\alpha \Delta V_1}} + \epsilon_r \qquad (15\text{-b})$$

For the phase b to ground fault:

$$K = \frac{k_1 + k_2 + k_0 \frac{\Delta V_0}{\alpha^2 \Delta V_1}}{2 + k_L + \frac{\Delta V_0}{\alpha^2 \Delta V_1}} + \epsilon_r \qquad (15\text{-c})$$

It will be noted that the voltage ratios in the last three equations differ only in their phase angles. These are the same as the ratios of the I Z drops of the corresponding sequence components. It can be shown that the phase angles of $\Delta I_o$ and $\Delta I_1$, $\alpha \Delta I_1$ and $\alpha^2 \Delta I_1$ in the three cases are approximately equal. Consequently each of the ratios is approximately equal to $$k_0' = \left|\frac{\Delta V_0}{\Delta V_1}\right| e^{j(\theta_0 - \theta_1)} \qquad (16)$$

The quantities $\theta_0$ and $\theta_1$ are the phase angles of $Z_o$ and $Z_1$ respectively.

When the mutual impedance $Z_{om}$ to a parallel line is significant, there is an additional approximation involved in equating the three ratios to $k'_o$ whenever the phase angle of $Z_{om}$ is different from that of $Z_o$. However, studies with representative values of system impedances indicate that the substitution is valid in practice. Equations 15-a, 15-b and 15-c may then be represented by the single equation:

$$K = \frac{k_1 + k_2 + k_0 k_0'}{2 + k_L + k_0'} + \epsilon_r \qquad (17)$$

For the a-g fault:

$$\epsilon_r = \frac{R_{1f}I_{1f} + R_{2f}I_{2f} + R_{0f}I_{0f}}{\Delta V_1 (2 + k_L + k_0')} \qquad (17\text{-a})$$

The $\epsilon_r$ expressions for the c-g and b-g faults are similar except for the phase angles associated with the $R_{2f}$ and $R_{of}$ terms.

It should be noted that the ratio $\Delta V_o/\Delta V_1$ is a phasor with phase angls of approximately o, $-2\pi/3$ or $+2\pi/3$ depending on whether the fault is on phase a, phase b or phase c. This ratio can therefore be used for identifying the faulted phase in the case of a single phase to ground fault. This information is useful for many control functions and for the post-fault analyses of system events. Alternatively, the ratio $\Delta V_2/\Delta V_1$ could be used for fault identification purposes. For convenience, the following ratio is defined:

$$k_3 = \frac{\Delta V_0}{\Delta V_1} \qquad (18)$$

Double-Phase to Ground Faults

The symmetrical component representation for this type of fault is shown in FIG. 7(d). The boundary conditions are:

For b-c-g fault:

$$E_{1w} = E_{2w} = E_{0w} \qquad (19\text{-a})$$

For a-b-g fault:

$$\alpha E_{1w} = \alpha^2 E_{2w} = E_{0w} \qquad (19\text{-b})$$

For a-c-g fault:

$$\alpha^2 E_{1w} = \alpha E_{2w} = E_{0w} \qquad (19\text{-c})$$

For the b-c-g fault it may be shown that $\Delta I_1$ is in approximately phase opposition to $\Delta I_2$ and $\Delta I_o$. A similar relation exists between the currents for the other two faults. This implies that for the b-c-g fault $$\frac{\Delta V_0}{\Delta V_1} \simeq -\left|\frac{\Delta V_0}{\Delta V_1}\right| e^{j(\theta_0 - \theta_1)}$$
$$\simeq -k_0' \qquad (20)$$

Using this equation, the boundary conditions and equations (8) yields:

$$K = \frac{k_1 + k_0 k_0'}{1 + k_0' + k_L} + \epsilon_r \qquad (21)$$

where for the b-c-g fault:

$$\epsilon_r = \frac{R_{0f}I_{0f} - R_{1f}I_{1f}}{\Delta V_1 (1 + k_0' + k_L)} \qquad (21\text{a})$$

The expression for $\epsilon_r$ is similar for the a-b-g and a-c-g faults except for phase angles $\alpha^2$ and $\alpha$ associated with the $I_{of}$ term.

Distance Relay Equation

The expressions for K for all types of faults are given by equations (9) (12), (17) and (21). Notice that only one equation is needed to describe one type of fault; the actual phases involved in the fault are immaterial.

A unification of these four equations is possible with the introduction of a new parameter $k'_2$ defined as:

$$k'_2 = \begin{cases} 1 & \text{if } \frac{|\Delta V_2|}{|\Delta V_1|} \simeq 1 \\ 0 & \text{otherwise} \end{cases} \qquad (22)$$

The four equations are not equivalent to the single expression:

$$K = \frac{k_1 + k_1 k'_2 + k_0 k'_0}{1 + k'_0 + k'_2 + k_L} + \epsilon_r \qquad (23)$$

This equation is the operating equation of the specific embodiment of the distance relay described herein. Suitable apparatus for implementing the equation will be described below.

Certain limitations on the values of some of the k-ratios in equation (23) may be imposed in facilitate computation. The ratios $k_o$ and $k_2$ will be further defined so that they are zero when $\Delta V_o$ and $\Delta V_2$ are zero or very small, respectively. This simplifies the task of calculating these ratios during normal system operation and under three-phase fault conditions when both the numerator and the denominator of these ratios are zero or very small, and avoids the uncertainties associated with the division of two very small numbers. Also, it avoids the possibility of producing large numbers in the numerator of K when these conditions exist.

Further, during normal system conditions the denominator of $k_1$ is zero or very small, and the numerator is about its normal value. Under these conditions actual division will give rise to an uncertain large number, and accordingly the value is set equal to a suitably selected large number such as 100 which will yield a value of K well outside the Zone 3 boundary of the relay characteristic.

Similarly, the maximum value of $k_L$ is limited to an arbitrary value such as unity which will yield a value of K well outside the Zone 3 boundary under normal operating conditions. Under normal operating conditions the numerator of $k_L$ depends on the load on the line, whereas the denominator depends on changes in the load. For a constant load the denominator will be zero, and for normal load changes will be small. However, under fault conditions the denominator can assume large values since the fault current can be many times the normal load current. Consequently the value of $k_L$ will become quite small, say 0.02–0.002. Therefore limiting the value to, say unity avoids excessive reduction in the value of K under normal operating conditions, while at the same time permitting proper computation under fault conditions.

A limitation on the value of $k_3$ and consequently on the value of $k_o'$ may also be imposed. In normal balanced system operation $\Delta V_o$ is zero or very small, and $\Delta V_1$ may be zero or small depending on load changes. Thus when either $\Delta V_o$ or $\Delta V_1$ is zero or small, the value of $k_o'$ may be set to an arbitrary small value, say unity, such that the value of K under normal operating conditions is well outside the Zone 3 boundary. Under fault conditions either or both of $\Delta V_o$ and $\Delta V_1$ may become quite large, and under such conditions the indicated division is performed.

It will be noted that the error terms given by equations (10), (13), (17-a) and (21-a) all include the fault resistance in the numerator. As previously stated, the fault arc is likely to be short during the initial period of the fault so that the fault resistance will be initially low. With high speed operation in accordance with the invention, the errors due to fault path resistance may be expected to be small. Pre-fault loading will also affect the error terms through the denominator thereof. This effect is similar to that in conventional distance relays. Inasmuch as the overall error term is likely to be small, the effect of system load on the estimate of K should be negligible. Analysis indicates that the magnitude of the error for each type of fault is essentially the same as that for conventional distance relays. In any event, by using a distance relay at each end of the transmission line to be protected, errors in K will not affect the reliability of the protection.

In order to isolate a transmission line or take other appropriate action promptly upon occurrence of a fault, high-speed distance relay operation is required. Inasmuch as the present distance relay uses symmetrical components of three-phase voltages and currents it is important to produce the symmetrical components very rapidly, preferably within one AC cycle or less. Specific apparatus for doing so will now be described.

In general, phase line voltages and currents are sampled at a rate which is high compared to the line frequency, for example at 720 Hz yielding 12 samples per cycle, and a recursive procedure is employed to insure that the symmetrical components are available on a real time basis and follow closely the changing conditions on a dynamic power system. Although the primary goal is to obtain the fundamental frequency symmetrical components, the apparatus can be modified to produce the symmetrical components of any harmonic of the fundamental frequency if desired.

DC offsets are known to exist in fault current waveforms on power systems, and are a frequent cause of incorrect operation of many protection and control devices. The apparatus described can remove the effects of such DC offsets.

Referring to FIG. 8, a block diagram of the apparatus for producing symmetrical components is shown. A power system 31 has suitable transducers 32 associated therewith to produce output signals proportional to the phase line voltages and currents. These are supplied to signal conditioning circuits 33 and thence to an analog-digital interface 34. If DC suppression is desired, the signals from 33 are passed through block 35 before going to interface 34. The digital outputs of interface 34 pass to the memory array system 36, the logic unit 37 and the symmetrical components array 38. Illustrative circuits for the blocks of FIG. 8 will now be described.

FIG. 9 illustrates suitable apparatus for blocks 31-35. Transducers responsive to the phase currents may take the form of conventional current transformers CT connected through respective resistors R1 to ground, thereby yielding outputs $I_a$, $I_b$ and $I_c$. The zero sequence current $I_o$ could be separately measured, but is here obtained by summing the phase currents through R2 to ground. Transducers responsive to phase to ground voltage here take the form of respective capacitor dividers formed by C1 and C2 to yield outputs $E_a$, $E_b$ and $E_c$. Other types of transducers may be used if desired.

The signal conditioning is performed by filters F. These may be low pass analog filters whose cut-off frequency is advantageously equal to or less than one-half the sampling frequency. For a sampling frequency of 720 Hz the cut-off frequency may be 360 Hz or less. A two-stage RC filter or an active filter may be employed.

As previously described in connection with FIG. 4, positive and negative sequence line voltage drops are conveniently obtained by multiplying the phase currents by the known positive sequence impedance $Z_1$ of the line, and the zero sequence current by the zero sequence impedance $Z_o$. This is accomplished in FIG. 9 by blocks 39, also labeled $xZ_1$ and $xZ_o$. If the mutual impedance to a parallel transmission line is significant, the line drop due to zero sequence current flowing in the adjacent line may be added to $I_o Z_o$ in FIG. 9. The resultant line drops, together with the phase voltages, are supplied to a multiplexer 41.

DC offsets may be suppressed by using circuits in blocks 39 such as shown in FIG. 10. FIG. 10(a) illustrates the use of a so-called "mimic" circuit having a shunt L-R circuit whose values equal those of the transmission line impedance for the corresponding sequence component. With a current $I_a$ flowing through the shunt circuit, the voltage across the circuit will be $I_a Z_1$. Similar results will be obtained for the zero sequence current using zero sequence values of the line L and R. FIG. 10(b) illustrates the use of an operational amplifier circuit having a gain equal to R(1+sT), where s is the La Place operator and equivalent to jω, and T=L/R of the transmission line for the sequence component involved. Both of these circuits will remove most of the DC offset introduced into the current waveforms by faults in the system.

The analog-digital interface 34 of FIG. 8 may be implemented by the multiplexer 41, the analog to digital converter 42 and the close pulse generator 43 of FIG. 9. Generator 43 produces a regularly recurring pulse output at the selected sampling frequency. The sampling frequency is advantageously 12f, where f is the line frequency. For 60 Hz systems, the sampling frequency is 720 Hz and the sampling interval is 1.39 milliseconds. The multiplexer input channels are denoted 1 to 7, for convenience. At the occurrence of a clock pulse, channel 1 is connected to ADC 42 and a corresponding digital signal appears in output line 44. With a high speed MXR this takes place very rapidly, say within 20 microseconds. The MXR then internally steps to channel 2, and the signal in that channel appears in digital form in output line 44. This continues until all seven channels have been converted to digital form. Upon occurrence of the next clock pulse the operation is repeated.

The action is illustrated in FIG. 12, where the clock pulses are illustrated in (a). The interval between the adjacent clock pulses 45 and 46 is expanded in (b). Here the seven pulses 47 represent the rapid stepping from channel to channel in multiplexer 41 upon the occurrence of a clock pulse 45. With sufficiently high speed MXR-ADC circuits, the channel to channel sampling may be treated as occurring at the same time.

For slower circuits, the arrangement of FIG. 11 may be substituted for the portion of FIG. 9 appearing between the dash lines 48. A sample and hold circuit 49 is inserted in each input 1-7 of MXR 41'. Upon occurrence of a clock pulse from 43, the circuits 49 are triggered simultaneously to hold their respective input values. MXR 41' and ADC 42' then operate as before, but at a slower rate, so that the digital signals in output line 44 correspond to simultaneous values of the input signals without introducing any false phase-shifts between the sampled signals.

Figure 13:
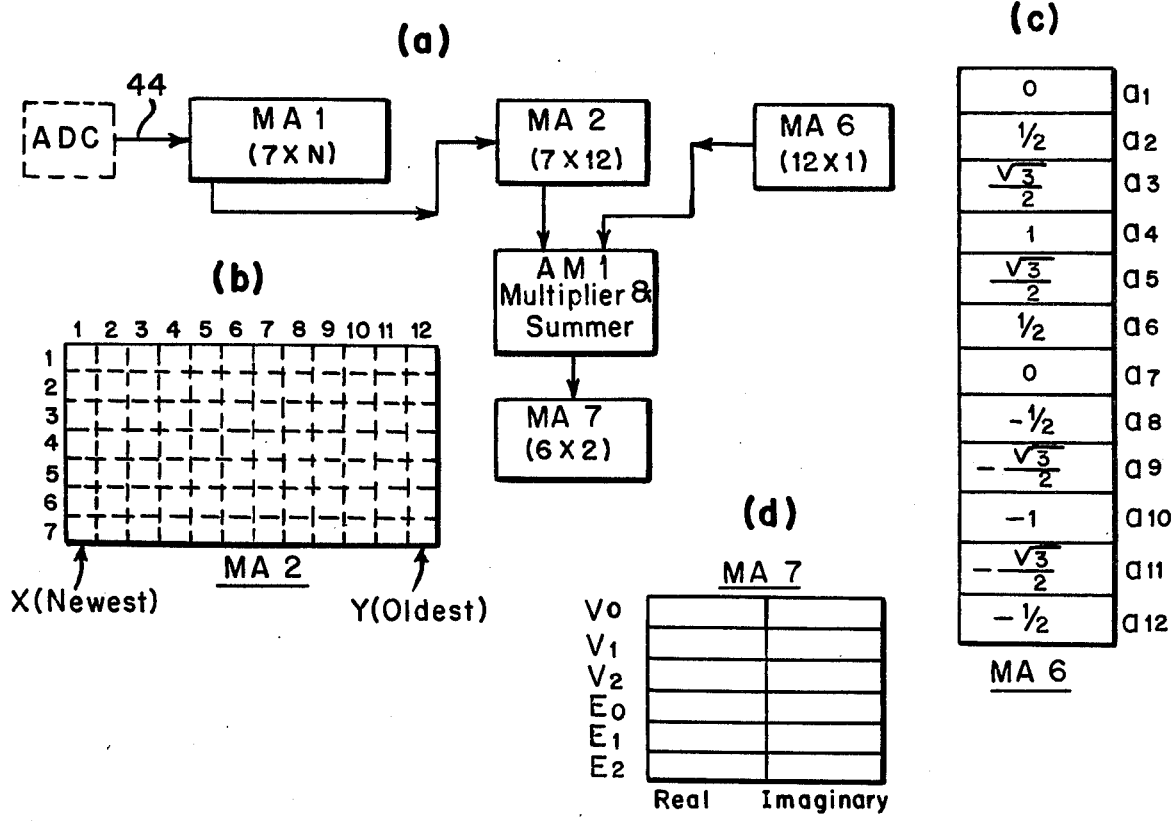
Figure 14:
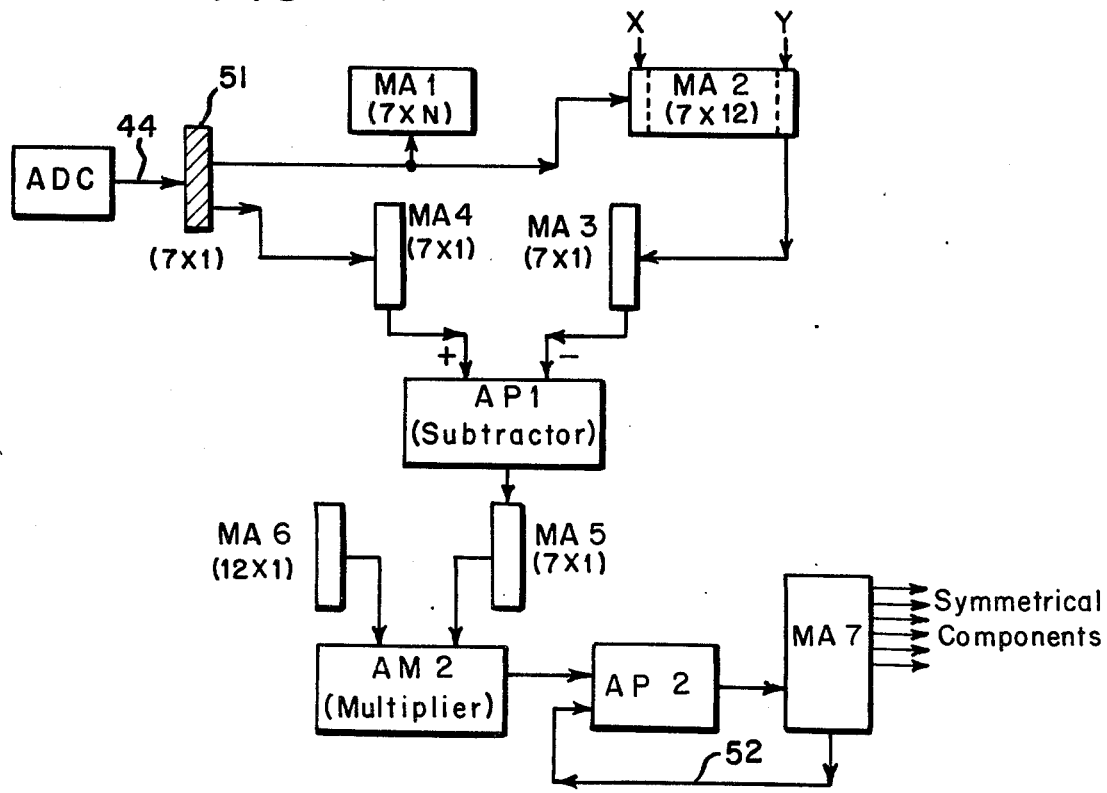

The memory arrays in block 36 of FIG. 8 are shown at various points in FIGS. 13 and 14 with the designation MA followed by a numeral. Each array has a selected number of rows and columns, as given in parentheses below the designation.

The logic unit 37 of FIG. 8 is shown in two different configurations in FIGS. 13 and 14. FIG. 13 shows the configuration for initially developing symmetrical components, and FIG. 14 shows a recursive configuration for keeping the symmetrical component information up to date.

Referring to FIG. 13, the digital signals in line 44 are supplied to memory MA1. This memory has seven rows for receiving digital signals corresponding to the seven channels of MXR 41, and has N columns determined by the total memory space available, say several hundred. The columns of each row can be visualized as being connected in a circular manner so that it is a continuous record without a logical end. As new samples arrive from line 44, they are effectively placed in column 1 of MA1, in respective rows, and old samples in column 1 are discarded.

The MA2 memory is also a circular memory having seven rows and twelve columns. As new samples arrive in MA1, they are effectively supplied to column 1 of MA2, in respective rows, and the previous samples in the columns of MA2 are effectively transferred to the next columns. Thus, MA2 always contains the twelve most recent samples of the signals in respective rows. This is indicated in FIG. 13(b) where the newest samples X are in column 1 and the oldest samples Y are in column 12.

It should be understood that the reference to rows and columns in the memories is for convenient visualization and description, and that the actual internal structure of the memories may differ.

Before proceeding further with the description of FIG. 13, the mathematical basis for subsequent operations will be described. With twelve samples per cycle at the fundamental frequency, and employing the discrete Fourier Transform, it can be shown that the following expressions apply for the symmetrical components.

$$E_1 = E_{1r} + jE_{1i} = \left\{ \sum_{k=1}^{12} (a_{k+3}e_{ak} + a_{k-1}e_{bk} + a_{k+7}e_{ck}) \right\} - j\left\{ \sum_{k=1}^{12} (a_k e_{ak} + a_{k-4}e_{bk} + a_{k+4}e_{ck}) \right\} \quad (24\text{-a})$$

$$E_2 = E_{2r} + jE_{2i} = \left\{ \sum_{k=1}^{12} (a_{k+3}e_{ak} + a_{k+7}e_{bk} + a_{k-1}e_{ck}) \right\} - j\left\{ \sum_{k=1}^{12} (a_k e_{ak} + a_{k+4}e_{bk} + a_{k-4}e_{ck}) \right\} \quad (24\text{-b})$$

$$E_0 = E_{0r} + jE_{0i} = \left\{ \sum_{k=1}^{12} a_{k+3}(e_{ak} + e_{bk} + e_{ck}) \right\} - j\left\{ \sum_{k=1}^{12} a_k(e_{ak} + e_{bk} + e_{ck}) \right\} \quad (24\text{-c})$$

In the above equations the subscripts r and i denote the real and imaginary components of the complex numbers for the respective positive, negative and zero symmetrical components denoted by the subscripts 1, 2 and 0. Subscripts a, b and c denote the phase and subscript k denotes the particular sample involved. Thus $e_{ak}$ denotes the k'th sample of the phase a voltage. The coefficients $a_k$ are a set of twelve constants as shown in FIG. 13(c) and correspond to the sines of 30°, 60°, 90°, etc. which are appropriate for 12 samples corresponding to a sample every 30° of the fundamental frequency waveform. The constants in FIG. 13(c) are to be treated as cyclic in nature, so that $a_{13}$ is the same as $a_1$.

The equations (24-a, b, c) above are for voltages. Similar equations hold for the symmetrical components of currents.

Returning to FIG. 13, the constants of FIG. 13(c) are stored in MA6 in twelve rows and one column. When the first twelve samples of the seven inputs to MXR41 of FIG. 9 have been digitized and placed in memory MA2, MA 2 will have been filled for the first time. The contents of MA2 and MA6 are then supplied to AM1 which is a multiplier and summer which multiplies each sample by the corresponding coefficient and sums the resultant products in accordance with equations (24-a),(24-b) and (24-c).

The complex values of the symmetrical components produced by AM1 are stored in memory MA7. This memory has six rows corresponding to the three symmetrical components of the transmission line voltages $E_o$, $E_1$ and $E_2$ and of the voltage drops $V_o$, $V_1$ and $V_2$ corresponding to current flow in the transmission line. The memory has two columns for the real and imaginary components of each symmetrical component, as indicated.

Having now obtained symmetrical components to initial line conditions, the units of FIG. 13 are reconnected as shown in FIG. 14, with additional units, so as to form a recursive arrangement which continually updates the symmetrical component values in MA7 as transmission line conditions change.

The operation is based on modification expressions which are similar for each of the components in MA7, and are given below for $E_1$:

$$E_{1r(New)} = E_{1r(Old)} + a_k (e_{a13} - e_{a1}) \quad (25)$$
$$+ a_{k+4} (e_{b13} - e_{b1})$$
$$+ a_{k+8} (e_{c13} - e_{c1})$$
$$E_{1i(New)} = E_{1i(Old)} + a_{k+9} (e_{a13} - e_{a1})$$
$$+ a_{k+1} (e_{b13} - e_{b1})$$
$$+ a_{k+5} (e_{c13} - e_{c1})$$

The quantity $e_{a13}$ is the most recent sample of $e_a$ in MA2, and $e_{a1}$ is the oldest sample. At the beginning of the updating, the coefficients $a_k$, $a_{k+4}$ etc. are as shown. Whenever a new sample is used to evaluate equations (25), the subscripts of the a's are incremented by 1.

For updating the negative sequence component $E_2$, the order of the coefficients in equations (25) become $a_k$, $a_{k+8}$ and $a_{k+4}$ for the real component, and $a_{k+9}$, $a_{k+5}$ and $a_{k+1}$ for the imaginary component, corresponding to the opposite sequence directions illustrated in FIG. 3. For the zero sequence component the coefficients are $a_k$ for the real component and $a_{k+9}$ for the imaginary component. These are in agreement with and serve to implement equations (1). As a new sample arrives, the subscripts of the a's are incremented by 1, similarly to those of $E_1$.

Referring to FIG. 14, the rectangle 51 symbolizes a new data sample set coming over line 44, one digital quantity for each of the seven inputs to the MXR of FIG. 9. The new data set is entered in MA1, the first column of MA2 and in MA4. The oldest sample set in MA2 is entered in MA3. The outputs of MA3 and MA4 are supplied to AP1, a subtractor which performs the subtraction indicated in equations (25) and stores the result in MA5. Array multiplier AM2 multiplies the contents of MA5 by coefficients obtained from MA6 and supplies the products to the Array Processor AP2.

AP2 receives the old values of the symmetrical components from MA7 through line 52 and adds to them the products from AM2 as required, in accordance with equations (25) supra. The new values are than delivered to MA7 to replace the old values.

As the next sample symbolized by 51 arrives, the operation is repeated. Thus the contents of MA7 are continually updated and represent real-time symmetrical components.

The preceding explanation of the production of symmetrical components assumes that twelve samples are taken during one full cycle of the power frequency. However, it should be pointed out that in the absence of a DC component and other even-order harmonics in the input waveforms, a data-set corresponding to a half-cycle of the fundamental frequency is sufficient to develop the symmetrical components. Thus, in situations where even harmonic effects are minor, even faster response can be obtained with half-cycle operation.

Other sampling rates can be employed if desired. In general the rate should be a multiple of three times the fundamental frequency. The entries in MA 6 will depend on the sampling rate chosen.

Figure 15:
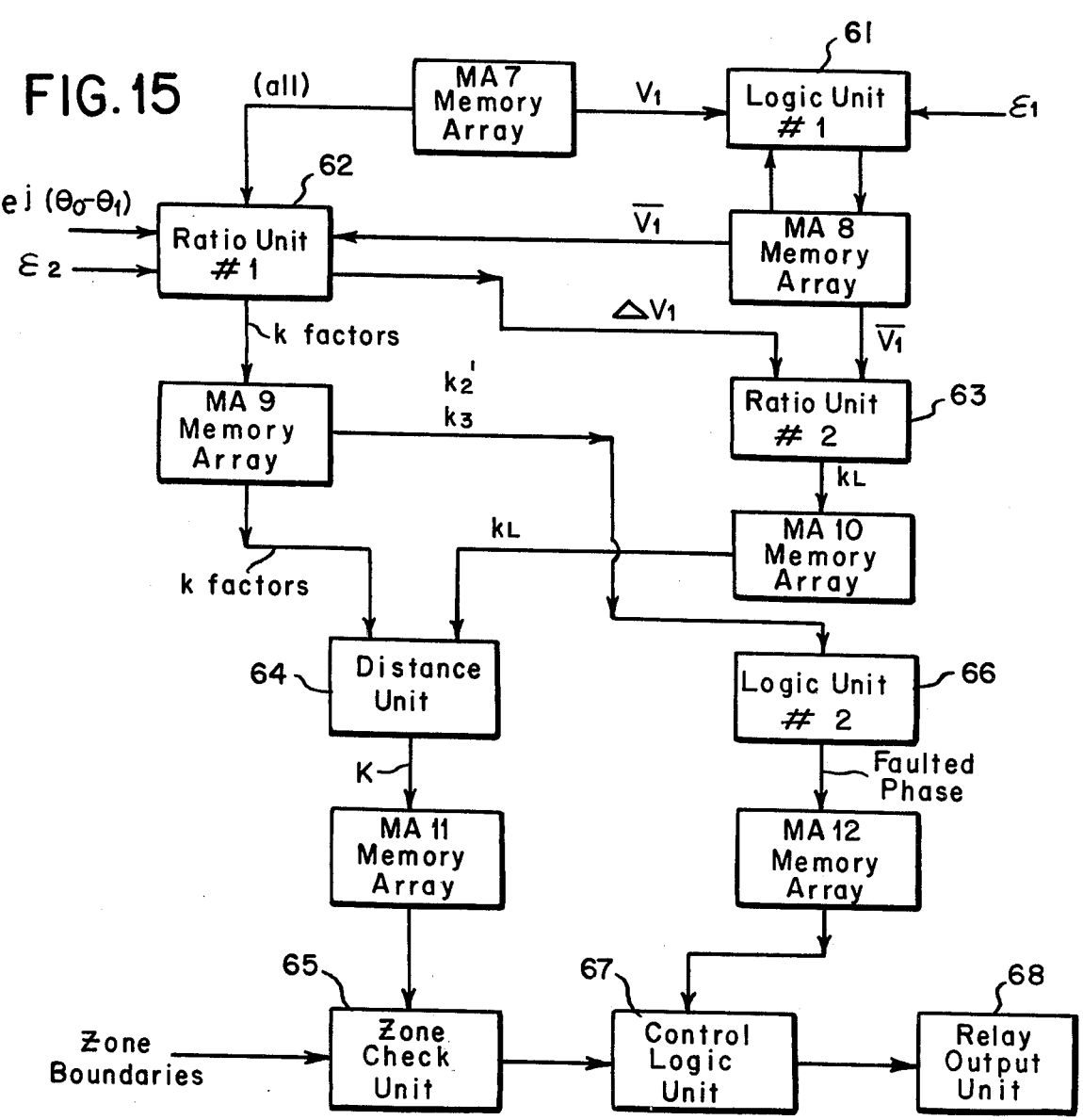
FIGS. 15 and 16 illustrate means for utilizing the symmetrical components of FIG. 8 to produce a distance relay.

Referring to FIG. 15, illustrative apparatus for implementing equation (23) is shown. The contents of MA7 are the symmetrical components shown in FIG. 13(d) kept continually up-to-date as described in connection with FIG. 14. For convenience, the principal equations involved in the implementation of FIG. 15 are given below as Table I.

TABLE I $$K = \frac{k_1 + k_2 k_2' + k_0 k_0'}{1 + k_0' + k_2' + k_L}$$

$$k_0 = \frac{E_0}{\Delta V_0}$$

$$k_1 = \frac{E_1}{\Delta V_1}$$

$$k_2 = \frac{E_2}{\Delta V_2}$$

$$k_3 = \frac{\Delta V_0}{\Delta V_1}$$

$$k_L = \frac{\overline{V}_1}{\Delta V_1}$$

$$k_0' = |k_3| \, e^{j(\theta_0 - \theta_1)}$$

$$k_2' = \begin{cases} 1 \text{ if } \frac{|\Delta V_2|}{|\Delta V_1|} \simeq 1 \\ 0 \text{ otherwise} \end{cases}$$

LINE VOLTAGES $E_0$ = Zero sequence
$E_1$ = Positive sequence
$E_2$ = Negative sequence

LINE VOLTAGE DROPS

| | |
|---|---|
| $V_0 = I_0 Z_0 + I_{02} Z_{0m}$ | (zero sequence) |
| $V_1 \equiv I_1 Z_1$ | (positive sequence) |
| $V_2 \equiv I_2 Z_1$ | (negative sequence) |

CHANGES IN VOLTAGE DROPS

| | |
|---|---|
| $\Delta V_0 = V_0 - \overline{V}_0 \simeq V_0$ | (zero sequence) |
| $\Delta V_1 = V_1 - \overline{V}_1$ | (positive sequence) |
| $\Delta V_2 = V_2 - \overline{V}_2 \simeq V_2$ | (negative sequence) |

At the beginning of the operation, logic unit 61 takes the value of $V_1$ and stores it in the MA8 memory array. At all succeeding intervals when a new set of values is entered into MA7, logic unit 61 compares the new value of $V_1$ with that stored in MA8, now denoted $\overline{V}_1$. If $V_1$ differs from $\overline{V}_1$ by a number greater than $\epsilon_1$, the logic unit freezes MA8 so that its content no longer changes, and $\overline{V}_1$ is supplied to ratio unit 62. If the difference is less than $\epsilon_1$, logic unit 61 replaces the content of MA8 with the newly obtained value of $V_1$ from MA7. Thus MA8 is continually updated unless the difference between its stored value and the newly arriving value exceeds $\epsilon_1$, thereby indicating an abnormal condition on the transmission line.

As noted before, under normal balanced conditions only positive sequence voltages and currents on the transmission line are of major significance. However, changes in load on the line may be expected even though no fault exists. Such changes in load will cause $V_1$ to change, since it is proportional to the positive sequence current. Thus the value of $\epsilon_1$ may be selected by the relay engineer based upon the normal rate of change of load on the line to be protected. The more rapidly the load can change, the higher the value of $\epsilon_1$. A typical value might be 0.05 $Z_1I_R$ where $Z_1$ is the positive sequence impedance and $I_R$ is the rated load current of the line.

Ratio unit 62 produces six of the seven k — ratios shown at the output of block 19 in FIG. 4, all except $k_L$. The ratios are defined in equations (7), (16), (18) and (22). Ratios $k_o$ and $k_2$ may be produced directly from the components in MA7, since $\Delta V_o$ and $\Delta V_2$ may be taken as equal to $V_o$ and $V_2$, respectively, as shown in equations (6). For $k_1$ the value of $\overline{V}_1$ from MA8 is subtracted from $V_1$ from MA7 to obtain $\Delta V_1$ and the ratio of $E_1$ to that quantity is produced. For $k_3$ the ratio of $V_o$ from MA7 to $\Delta V_1$ is produced. Inasmuch as the components are complex numbers, the ratios will be complex numbers.

The factor $k_o'$ is the magnitude of $k_3$ multiplied by an exponential term involving the difference between the phase angles of the zero and positive sequency impedances of the transmission line. Since these phase angles are known, they are supplied to ratio unit 62 as indicated.

The production of $k_2'$ (equation 22) involves a comparison of the magnitude of the changes in the positive and negative sequence voltage drops to determine whether they are approximately equal. Accordingly a tolerance $\epsilon_2$ is supplied to unit 62. If the difference between the magnitudes of $V_2$ from MA7 and $\Delta V_1$ as determined in 62 is less than $\epsilon_2$, they are considered to be equal and the value of $k_2'$ is unity. If the difference is greater than $\epsilon_2$, the value of $k_2'$ is zero. The tolerance may be selected by the relay engineer. For example, it may be set at about $0.05E_R$ where $E_R$ is the rated phase to neutral voltage of the transmission line. The k-factors produced in unit 62 are stored in MA9.

The ratio $k_L$ is produced by the ratio unit 63 in accordance with equation (7). The quantities involved are obtained from MA8 and 62 as indicated, and the resultant is stored in MA10.

As discussed above, the values of $k_o$ and $k_2$ produced in ratio unit 62 are made equal to zero when the values of $V_o$ and $V_2$ from MA7 are zero, respectively. Also, the maximum value of $k_1$ is limited to a suitable large value, say 100. Similarly, the maximum value of $k_L$ produced in ratio unit 63 is limited to an arbitrary value, say unity. The value of $k_3$, and consequently the value of $k_o'$, is made equal to an arbitrary small number, say unity, when either $V_o$ or $\Delta V_1$ are zero or small.

It should be noted that $k_L$ is a load current compensation factor. In the event that the generating capacity connected to the transmission line is capable of supplying a fault current which exceeds the maximum load current by more than a ratio of 10, the factor may be set equal to zero in equation (23). Also, under this condition $\overline{V}_1$ in equations (6) may be considered to be negligible and $\Delta V_1$ made equal to $V_1$. This eliminates the need for the subtraction in producing $k_1$ and $k_3$ and in producing $k_o'$. Consequently the logic unit 61, MA8, ratio unit 63, and MA10 may be eliminated. This situation may frequently exist in practice.

The distance unit 64 receives the k-factors from MA9 and MA10 and produces the fractional distance K in accordance with equation (23). This is a complex number and is stored in MA11.

Figure 16:
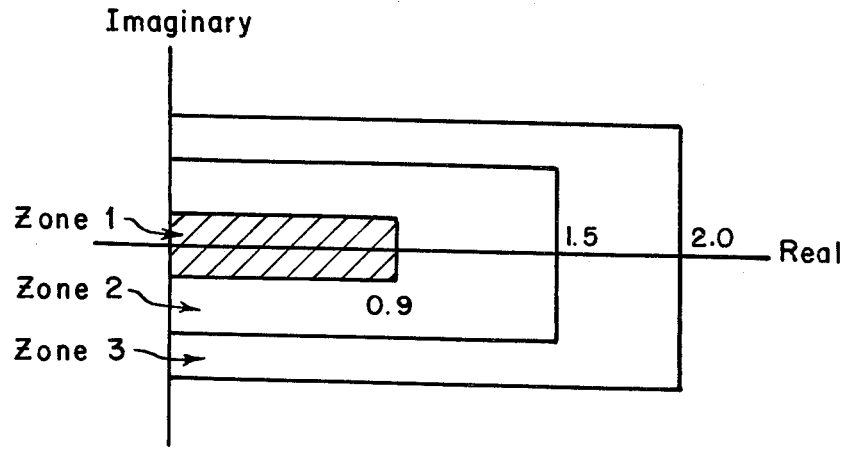

The output of MA11 is supplied to Zone Check Unit 65. For any of the ten faults that may occur on the transmission line being protected, the value of K is primarily real and lies between 0 and 1, except for errors discussed previously. A small reactance component may exist due to fault resistance. For all other faults or other disturbances, the value of K is either negative or greater than one, or has a large imaginary part. Real and imaginary boundaries for Zone 1, Zone 2 and Zone 3 protection may be established by the relay engineer and supplied to unit 65. One simple zone boundary specification is shown in FIG. 16 for illustrative purposes.

As previously discussed, in the case of a single phase to ground fault the ratio $k_3$ defined in equation (18) may be used to identify the faulted phase. Accordingly $k_3$ is supplied from MA9 to logic unit 66, along with $k_2'$. Logic unit 66 determines the faulted phase in accordance with the following table:

TABLE II

| | Fault Phase Classification | |
|---|---|---|
| $k_2'$ | Phase Angle of $k_3$ | Faulted Phase |
| 1 | 0° | phase a |
| 1 | −120° | phase b |
| 1 | +120° | phase c |

In this table the ratio $k_3$ is zero for a three-phase fault and for a phase-to-phase fault. The ratio $k_2'$ is zero for a double phase to ground fault. For single phase to ground faults $k_2'$ is unity and the angle of $k_3$ indicates the faulted phase.

The output of unit 66 is stored in memory unit MA12. The memory unit may contain three flip-flop type switches, one for each phase. These may normally be in one condition (say logical 0) and the appropriate flip-flop actuated to its other condition (say logical 1) upon the occurrence of a fault corresponding to its phase.

Control logic unit 67 receives the output of the zone check unit and determines what, if any, control action is to be taken. For example, a fault lying outside all the relay zones would require no action, a fault in Zone 1 would require an immediate trip signal to the corresponding circuit breakers, and a fault in Zones 2 and 3 would start a time counter so that a trip signal would be provided after a desired delay if the fault has not been cleared. The unit also receives the output of MA12 to indicate the faulted phase in the case of a single-phase to ground fault and takes this into account, if desired, in determining the action to be taken.

The output of unit 67 is supplied to relay output unit 68 to actually execute the functions dictated by unit 67. Multiple contact outputs for tripping functions, and carrier control functions may also be provided. If desired, generator protection functions can be provided in cases where a distance relay is deemed appropriate for particular generator protection functions, in addition to the transmission line protection functions.

In the implementation described above, complex numbers have been utilized. In many instances the calculations can be simplified. For example, except at the balance point of zone boundaries, all the k-factors may be assumed to be real, thus leading to simpler and faster implementation. Thus, with distance relays at each end of the transmission line, as indicated at 10 and 11 in FIG. 2, using only real portions of the k-factors may suffice, since each relay will adequately protect against faults occurring near the corresponding end of the line.

The invention has been described in connection with a specific embodiment thereof, and a number of modifications have been mentioned. It will be understood that other modifications are possible, and that certain features may be employed and others omitted as meets the requirements of a particular application.

I claim:

1. A distance relay system for a three-phase electric power transmission line which comprises
   (a) means responsive to the phase voltages of said three-phase transmission line for producing positive, negative and zero sequence symmetrical component voltages corresponding thereto,
   (b) means responsive to respective phase and zero sequence currents of said three-phase transmission line and the positive and zero sequence impedances of the line for producing positive, negative and zero sequence symmetrical component voltage drops,
   (c) means for producing predetermined ratios of said positive, negative and zero sequence voltages and substantial changes in said positive, negative and zero sequence voltage drops,
   (d) means utilizing said ratios for producing a distance factor corresponding to the ratio of the distance to a fault on said line and the length of the line,
   (e) and means for producing a fault signal when said distance factor lies between predetermined fault values.

2. A distance relay according to claim 1 in which said predetermined ratios include $k_3 = \Delta V_o/\Delta V_1$ where $\Delta V_o$ and $\Delta V_1$ are the changes in zero sequence and positive sequence voltage drops, respectively, and means for utilizing the phase angle of $k_3$ to produce a signal identifying a faulted phase.

3. A distance relay according to claim 1 in which said distance factor is substantially equivalent to the factor K where $$K = \frac{k_1 + k_2 k_2' + k_0 k_0'}{1 + k_0' + k_2' + k_L}$$

and the quantities are as set forth in Table 1.

4. A distance relay according to claim 3 in which the values of $k_o$ and $k_2$ are substantially zero when $\Delta V_o$ and $\Delta V_2$ are substantially zero, respectively, and the maximum value of $k_L$ is limited to a predetermined value yielding a value of K greater than said predetermined fault values under normal operating conditions of the transmission line.

5. A distance relay according to claim 4 in which, when either $\Delta V_o$ or $\Delta V_1$ is zero or small, the value of $k_o'$ is set to a predetermined value yielding a value of K greater than said predetermined fault values under normal operating conditions of the transmission line.

6. A distance relay according to claim 5 in which the maximum value of $k_1$ is limited to a predetermined value producing a value of K greater than said predetermined fault values under normal operating conditions of the transmission line.

7. A distance relay according to claim 1 in which said distance factor is substantially equivalent to the factor K where $$K = \frac{k_1 + k_2 k_2' + k_0 k_0'}{1 + k_0' + k_2' + k_L}$$

and the quantities are as set forth in Table I, and in which a said fault signal is produced when the distance factor K lies between zero and a predetermined value less than unity.

8. A distance relay according to claim 7 including means for utilizing the phase angle of $k_3 = \Delta V_o/\Delta V_1$ to produce a signal identifying a faulted phase.

9. A distance relay according to claim 7 including means for utilizing the phase angle of $k_3 = \Delta V_o/\Delta V_1$ and a value of $k_2'$ of unity to produce a signal identifying a faulted phase.

10. A distance relay according to claim 1 in which said distance factor is substantially equivalent to the factor K where $$K = \frac{k_1 + k_2 k_2' + k_0 k_0'}{1 + k_0' + k_2'}$$

and the quantities are as set forth in Table I with $\Delta V_1$ substantially equal to said positive sequence voltage drop.

11. A distance relay according to claim 10 in which the values of $k_o$ and $k_2$ are substantially zero when $\Delta V_o$ and $\Delta V_2$ are substantially zero, respectively.

12. A distance relay system for a three-phase electric power transmission line which comprises
   (a) means responsive to the phase voltages of said three-phase transmission line for producing positive, negative and zero sequence symmetrical component voltages corresponding thereto,
   (b) means responsive to respective phase and zero sequence currents of said three-phase transmission line and the positive and zero sequence impedances of the line and to the zero sequence current and mutual impedance of an adjacent parallel transmission line,
   (c) means for producing predetermined ratios of said positive, negative and zero sequence voltages and substantial changes in said positive, negative and zero sequence voltage drops,
   (d) means utilizing said ratios for producing a distance factor corresponding to the ratio of the distance to a fault on said line and the length of the line,
   (e) and means for producing a fault signal when said distance factor lies between predetermined fault values.

* * * * *

UNITED STATES PATENT AND TRADEMARK OFFICE
CERTIFICATE OF CORRECTION

PATENT NO. : 4,148,087

DATED : April 3, 1979

INVENTOR(S) : Arun G. Phadke

It is certified that error appears in the above-identified patent and that said Letters Patent are hereby corrected as shown below:

Column 1, line 27, "approprate" should read --appropriate--;
          line 61, "somehwat" should read --somewhat--.

Column 3, line 20, "shwon" should read --shown--.

Column 4, line 37, "clock" should read --block--;
          line 39, "denored" should read --denoted--.

Column 5, line 6, delete ":b" before "0.9";
          line 27, "delay" should read --relay--.

Column 6, line 14, "varibles" should read --variables--;
          line 29, delete the parenthesis before "1/3".

Column 7, line 4, "equation (2)" should read --equations (2)--;
          line 24, the equation should read
$$--\Delta V_0 = V_0 - \overline{V}_0 \cong \tilde{V}_0--$$

line 26, the equation should read
$$--\Delta V_1 = V_1 - \overline{V}_1--$$

line 28, the equation should read
$$--\Delta V_2 = V_2 - \overline{V}_2 \cong \tilde{V}_2--$$

line 48, after "$E_{2w}$" insert-- = -- line 61, "phase" should read --phases--.

UNITED STATES PATENT AND TRADEMARK OFFICE
CERTIFICATE OF CORRECTION

PATENT NO. : 4,148,087
DATED : April 3, 1979
INVENTOR(S) : Arun G. Phadke

It is certified that error appears in the above-identified patent and that said Letters Patent are hereby corrected as shown below:

Column 9, line 60, "angls" should read --angles--.

Column 13, line 12, "close" should read --clock--.

Signed and Sealed this

Sixteenth Day of October 1979

[SEAL]

Attest:

RUTH C. MASON
Attesting Officer

LUTRELLE F. PARKER
Acting Commissioner of Patents and Trademarks